United States Patent
Mo et al.

[11] Patent Number: 5,961,461
[45] Date of Patent: Oct. 5, 1999

[54] METHOD AND APPARATUS FOR ADAPTIVE B-MODE IMAGE ENHANCEMENT

[75] Inventors: Larry Y. L. Mo, Waukesha; Steven C. Miller, Pewaukee, both of Wis.

[73] Assignee: General Electric Company, Milwaukee, Wis.

[21] Appl. No.: 08/966,376

[22] Filed: Nov. 7, 1997

[51] Int. Cl.[6] .......................................... A61B 8/00
[52] U.S. Cl. ............................................. 600/443
[58] Field of Search ................... 600/443, 447, 600/437, 444, 454; 128/910

[56] References Cited

U.S. PATENT DOCUMENTS

| | | | |
|---|---|---|---|
| 5,329,929 | 7/1994 | Sato et al. | 600/443 |
| 5,622,174 | 4/1997 | Yamazaki | 600/441 |
| 5,718,229 | 2/1998 | Pesque et al. | 600/441 |

OTHER PUBLICATIONS

Gehlbach, "Speckle reduction processing," SPIE vol. 768 Int'l Symp. Pattern Recog. & Acoust. Imaging, pp. 178–180 (1987).

Kotropoulos et al., "Optimum nonlinear signal detection and estimation in the presence of ultrasonic speckle," Ultrasonic Imaging, vol. 14, pp. 249–275 (1992).

Rhyne et al., "An optimal measurement of integrated backscatter and cyclic variation of integrated backscatter," Ultrasonic Imaging, vol. 12, pp. 189–204 (1990).

*Primary Examiner*—Marvin M. Lateef
*Assistant Examiner*—Maulin Patel
*Attorney, Agent, or Firm*—Dennis M. Flaherty; Christian G. Cabou; Phyllis Y. Price

[57] ABSTRACT

A method and an apparatus for adaptively enhancing the B-mode image during post-detection image processing in an ultrasound imaging system. A low pass filter which smooths out speckle and a high pass filter which enhances edges are placed in parallel signal paths connected to the output of an envelope detector in a B-mode processor. The signals in the high pass filter path are logarithmically compressed before high pass filtering. The signals in the low pass filter path are logarithmically compressed after low pass filtering. Respective weighting factors are applied to the low- and high-pass-filtered signals by an adaptive weighting device, which may take the form of a processor or a look-up table. The weighted low- and high-pass-filtered signals are then summed and optionally input to an anti-aliasing low pass filter before decimation and scan conversion.

20 Claims, 5 Drawing Sheets

METHOD AND APPARATUS FOR ADAPTIVE B-MODE IMAGE ENHANCEMENT

FIELD OF THE INVENTION

This invention generally relates to ultrasound imaging of human tissue and blood. In particular, the invention relates to methods for improving the quality of a B-mode ultrasound image.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred vector direction and is focused at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer is employed to receive the reflected sound (receiver mode). The voltages produced at the receiving transducers are summed so that the net signal is indicative of the ultrasound reflected from a single focal point in the object. As with the transmission mode, this focused reception of the ultrasonic energy is achieved by imparting separate time delays (and/or phase shifts) and gains to the signal from each receiving transducer.

FIG. 1 depicts a conventional B-mode ultrasound imaging system comprising a beamformer 2, a B-mode processor 4, a scan converter/display controller 6 and a kernel 8. System control is centered in the kernel, which accepts operator inputs through an operator interface 10 and in turn controls the various subsystems. The master controller 12 performs system level control functions. It accepts inputs from the operator via the operator interface 10 as well as system status changes and makes appropriate system changes either directly or via the scan controller. The system control bus 14 provides the interface from the master controller to the subsystems. The scan control sequencer 16 provides real-time (acoustic vector rate) control inputs to the beamformer 2, system timing generator 24, B-mode processor 4 and scan converter 6. A scan control sequencer 16 is programmed by the host with the vector sequences and synchronization options for acoustic frame acquisitions. The scan control sequencer broadcasts the vector parameters defined by the host to the subsystems via scan control bus 18.

The main data path begins with the analog RF inputs to the beamformer 2 from a transducer array 20. The beamformer 2 converts the analog signal into a stream of digital samples and outputs two summed digital receive beams, which are shown as complex I,Q data in FIG. 1, but in general, can also be radio or intermediate frequency data. The I,Q data is input to B-mode processor 4 and output as processed vector (beam) data to the scan converter/display processor 6. The scan converter accepts the processed vector data and outputs the video display signals for the image to a color monitor 22.

Referring to FIG. 2, a conventional ultrasonic imaging system incorporates a transducer array 20 comprised of a plurality of separately driven transducer elements 26, each of which produces a burst of ultrasonic energy when energized by a pulsed waveform produced by a transmit section of the beamformer 2. The ultrasonic energy reflected back to transducer array 20 from the object under study is converted to an electrical signal by each receiving transducer element 26 and applied separately to a receive section of beamformer 2 through a set of transmit/receive (T/R) switches 28. The T/R switches 28 are typically diodes which protect the receive electronics from the high voltages generated by the transmit electronics. The transmit signal causes the diodes to shut off or limit the signal to the receive section.

The transmit and receive sections of the beamformer are operated under control of a beamformer controller (not shown) responsive to commands by a human operator. The elements of the transducer array 20 are driven such that the ultrasonic energy produced is directed, or steered, in a beam. To accomplish this, respective time delays are imparted to a multiplicity of pulsers 28. Each pulser is connected to a respective transducer element via the T/R switches. The transmit focus time delays are preferably read from a look-up table 32. By appropriately adjusting the transmit focus time delays in a conventional manner, the ultrasonic beam can be directed away from axis Y by an angle θ and/or focused at a fixed range R. A sector scan is performed by progressively changing the transmit focus time delays in successive excitations. The angle θ is thus changed in increments to steer the transmitted beam in a succession of directions.

The echo signals produced by each burst of ultrasonic energy reflect from objects located at successive ranges along the ultrasonic beam. The echo signals are sensed separately by each transducer element 26 and a sample of the magnitude of the echo signal at a particular point in time represents the amount of reflection occurring at a specific range. Due to the differences in the propagation paths between a reflecting point P and each transducer element 26, however, these echo signals will not be detected simultaneously and their amplitudes will not be equal. The receive section of beamformer 2 imparts the proper time delay to each received signal and sums them to provide a single echo signal which accurately indicates the total ultrasonic energy reflected from point P located at range R along the ultrasonic beam oriented at the angle θ. To accomplish this, respective receive focus time delays are imparted to a multiplicity of receive channels 34. Each receive channel is connected to a respective transducer element via a T/R switch. The receive focus time delays are preferably read from a look-up table 38. The receive channels also have circuitry (not shown) for apodizing and filtering the received pulses. The time-delayed receive signals are then summed in receive summer 36.

Referring to FIG. 3, the receive section of beamformer 2 comprises a time-gain control section and a receive beam-forming section. Time-gain control (TGC) section includes a respective amplifier 40 for each of the receiver channels 34 and a time-gain control circuit 42. The input of each amplifier 40 is connected to a respective transducer element 26 to amplify the echo signal which it receives. The amount of amplification provided by amplifiers 40 is controlled by a TGC circuit 44, which is set by hand operation of a multiplicity of potentiometers 44.

The receive beamforming section comprises separate receive channels 34. Each receive channel 34 receives the analog echo signal from one of amplifiers 40. Each amplified signal is conveyed to a pair of quadrature detectors in the respective receiver channel, where the phases of the mixing reference frequency differ by 90°. Since this reference frequency is made identical to that of the transmitted pulses, the outputs from a low-pass filter in the receive channel become complex signals (I and Q) with phases that differ by 90°. These signals are output as a stream of digitized output values on an I bus 45a and a Q bus 45b (or an equivalent RF bus). Each of these I and Q baseband signals represents a demodulated sample of the echo signal envelope at a specific range R. These samples have been delayed such that when they are summed at summing points 36a and 36b with the I and Q samples from each of the other receive channels 34, the summed signals indicate the magnitude and phase of the echo signal reflected from a point P located at range R on the steered beam ($\theta$).

A detector 46, incorporated in the B-mode processor 4, receives the beam samples from summing points 45a and 45b. The I and Q values of each beam sample are signals representing the in-phase and quadrature components of the magnitude of the reflected sound from a point (R, $\theta$). The detector 46 computes the quantity $(I^2+Q^2)^{1/2}$, which represents the envelope of the baseband data. If the beam samples are RF data, the envelope of the signal can be obtained via a standard rectifier followed by a low pass filter. The B-mode function images the time-varying amplitude of the envelope of the signal as a grey scale with some additional processing (hereinafter referred to as "post-detection image processing"), such as edge enhancement and logarithmic compression.

The scan converter 64 (see FIG. 1) receives the display data from the B-mode processor 4 and converts the data into the desired image for display. In particular, the scan converter 24 converts the acoustic image data from polar coordinate (R–$\theta$) sector format or Cartesian coordinate linear array to appropriately scaled Cartesian coordinate display pixel data at the video rate. This scan-converted acoustic data is then output for display on display monitor 22, which images the time-varying amplitude of the envelope of the signal as a grey scale.

Ultrasound imaging suffers from the inherent imaging artifact referred to as speckle. Speckle is the mottling found in the images produced from interference patterns of multiple receive echoes. This mottling is primarily caused by the null in the acoustic interference pattern, but other anomalies in the image, e.g., random electronic noise, can cause mottling. The acoustic nulls are accentuated by the logarithmic compression required to display the full dynamic range of the ultrasound image. These nulls appear as black holes in the image. It is desirable to minimize speckle to improve image quality.

Post-detection image processing generally consists of dynamic range (logarithmic) compression, a low pass filter and an edge enhancement filter. While these may be arranged in different orders on different scanners, they are usually done in a sequential manner. Traditionally the low pass filter is designed to prevent aliasing before data downsampling, but it can also play the role of speckle reduction in a wideband imaging system. The edge enhancement filter is usually a high pass filter that acts on the log-compressed data.

Detected images of real anatomy usually contain both large reflected signals (from edges) and low amplitude speckle (from soft tissue). Therefore, if the low pass filter and high pass filter simply perform their tasks blindly, there is always a tendency for these filters to smear out edges and enhance background speckle respectively. With a sequential processing configuration, it is very difficult to keep the low pass and high pass filters from acting on the wrong features. The best that can often be achieved is a compromise between speckle smoothing and edge enhancement.

FIGS. 4A–4C shows three basic prior art configurations for sequential post-detection processing in an ultrasound imaging system. The first configuration shown in FIG. 4A is similar to the post-detection processing method used on analog systems and comprises in sequence means for logarithmic data compression 48, an edge-enhancing high pass filter 50 and a low pass filter 52. The low pass filter 52 is typically a 4th to 6th order IIR filter with a frequency cutoff set according to the decimation rate before scan conversion. An advantage of the first configuration is that the high pass filter 50 is effective for enhancing edges in log-compressed images. If the detected image is subject to high pass filtering before logarithmic compression, any edge enhancement effect would likely be diminished by the logarithmic compression. One disadvantage of the first configuration is that a post-logarithmic compression low pass filter is intended for anti-aliasing and is less effective for reducing speckle.

A second configuration is shown in FIG. 4B. In an actual implementation of this configuration, the decimator or rate converter may appear before the edge enhancement filter 50. Thus, the low pass filter 52 can serve the dual purpose of speckle smoothing and anti-aliasing. One advantage of the second configuration is that the low pass filter is optimally positioned (upstream of the nonlinear compression) for speckle reduction. Disadvantages of the second configuration are that the low pass filter tends to smear out edges; the high pass filter may also enhance the background speckle, thereby canceling out the effects of the low pass filter; and the low pass filter position is not optimal for anti-aliasing since the signal bandwidth expands again after logarithmic compression.

A third configuration is shown in FIG. 4C. As in the second configuration, decimation and rate conversion can occur before edge enhancement filtering. The main improvement lies in the adaptive nature of the edge enhancement filter, which is typically comprised of parallel high pass filter and all-pass paths. Advantages of the third configuration are that the adaptive edge enhancement filter tries to differentiate edges from speckle based on their amplitude differences; and that the edge enhancement filter tends to enhance large amplitude edges only. Disadvantages include the following: the edges are already smeared by the low pass filter before the processed signals reach the adaptive edge enhancement filter; and the position of the adaptive mechanism is not optimal, i.e., differences between edge and speckle amplitudes have already been significantly reduced by the logarithmic compression.

In accordance with a fourth configuration (not shown), the RF spectrum is split into two or more sub-bands which are then detected separately. Summing the incoherent images after detection is an effective way of reducing speckle. However, this form of frequency compounding has the same statistical performance as that of the second configuration shown in FIG. 4B. While the incoherent summing after detection can reduce speckle, the splitting of the RF spectrum has the same resolution degradation (edge smearing) effect as the low pass filter in the second configuration.

SUMMARY OF THE INVENTION

The present invention is a method and an apparatus for adaptively enhancing the B-mode image during post-detection image processing in an ultrasound imaging system. Speckle smoothing and edge enhancement often impose conflicting requirements in B-mode post-detection processor design. A low pass filter which can smooth out speckle will also tend to smear out any edges in a detected image. A high pass filter which is intended to enhance edges also tends to enhance the background speckle or cancel out the effects of the smoothing filter. In addition, optimal estimation theory indicates that speckle smoothing is best performed prior to any nonlinear compression, whereas edge enhance filtering is more effectively done after logarithmic compression. For these reasons, the best that the sequential post-detection processing methods in conventional B-mode systems can achieve is a compromise between speckle smoothing and edge enhancement.

The present invention utilizes a post-detection image processing technique based on parallel signal paths to provide adaptive B-mode image enhancement. The parallel signal paths in accordance with this technique include a high pass filter path for selectively enhancing edges in the image and a low pass filter path for selectively smoothing out only background speckle.

Compared to conventional sequential post-detection processing methods, the method in accordance with the invention requires mainly one additional log operation and can be implemented in software as well as hardware.

In accordance with the preferred embodiment of the adaptive B-mode image enhancer, a low pass filter which smooths out speckle and a high pass filter which enhances edges are placed in parallel signal paths connected to the output of the envelope detector. The signals in the high pass filter path are logarithmically compressed before high pass filtering. The signals in the low pass filter path are logarithmically compressed after low pass filtering. Respective weighting factors are applied to the low- and high-pass-filtered signals by an adaptive weighting device, which may take the form of a processor or a look-up table. The weighted low- and high-pass-filtered signals are then summed and optionally input to an anti-aliasing low pass filter before decimation and scan conversion.

In general, the entire adaptive weighting and summing operation can also be implemented in the form of a look-up table, provided both the low- and high-pass filtered signals are available as inputs.

DETAILED DESCRIPTION OF THE PREFERRED EMBODIMENTS

Figure 1:
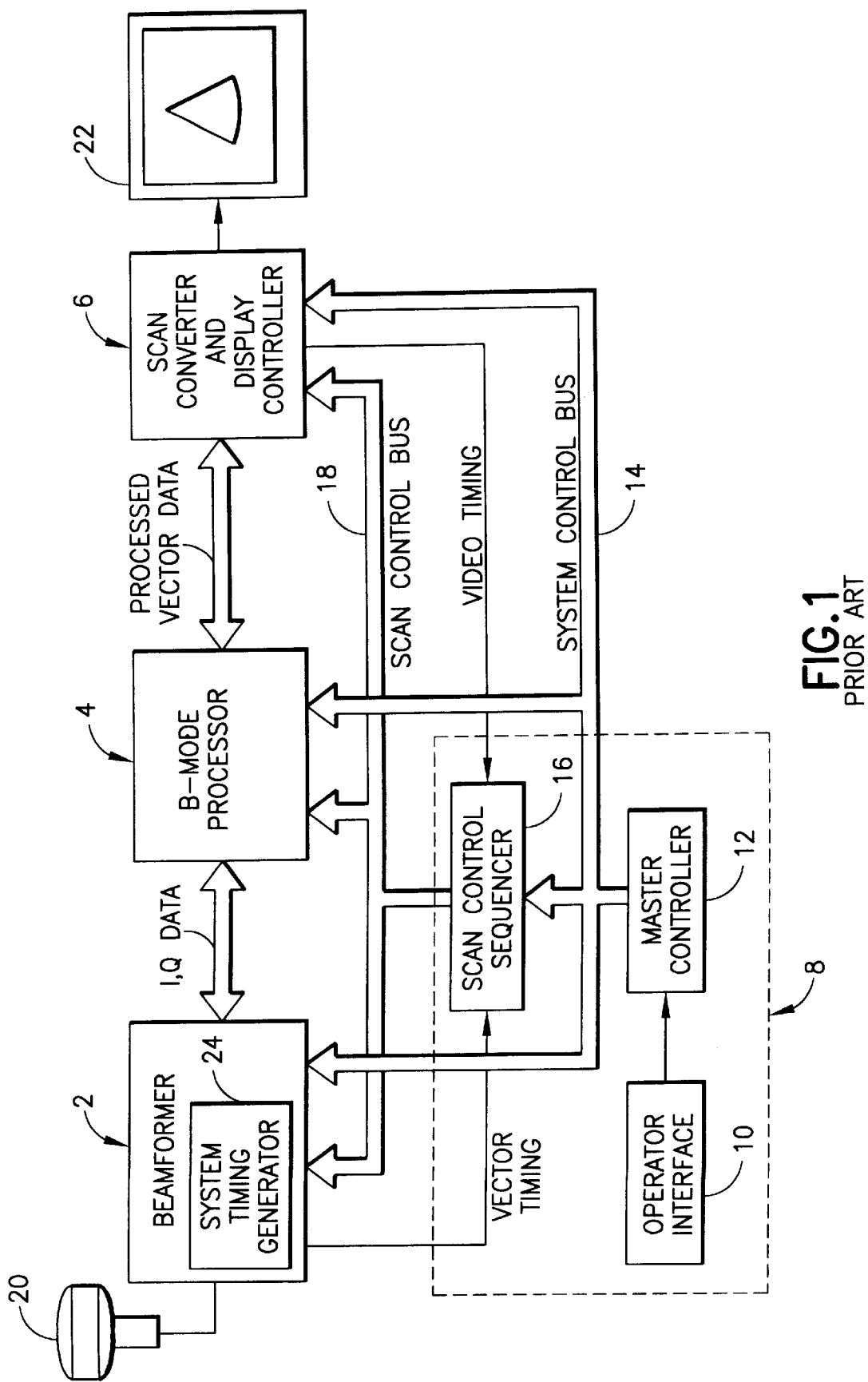
FIG. 1 is a block diagram showing the major functional subsystems within a real-time ultrasound imaging system.
Figure 2:
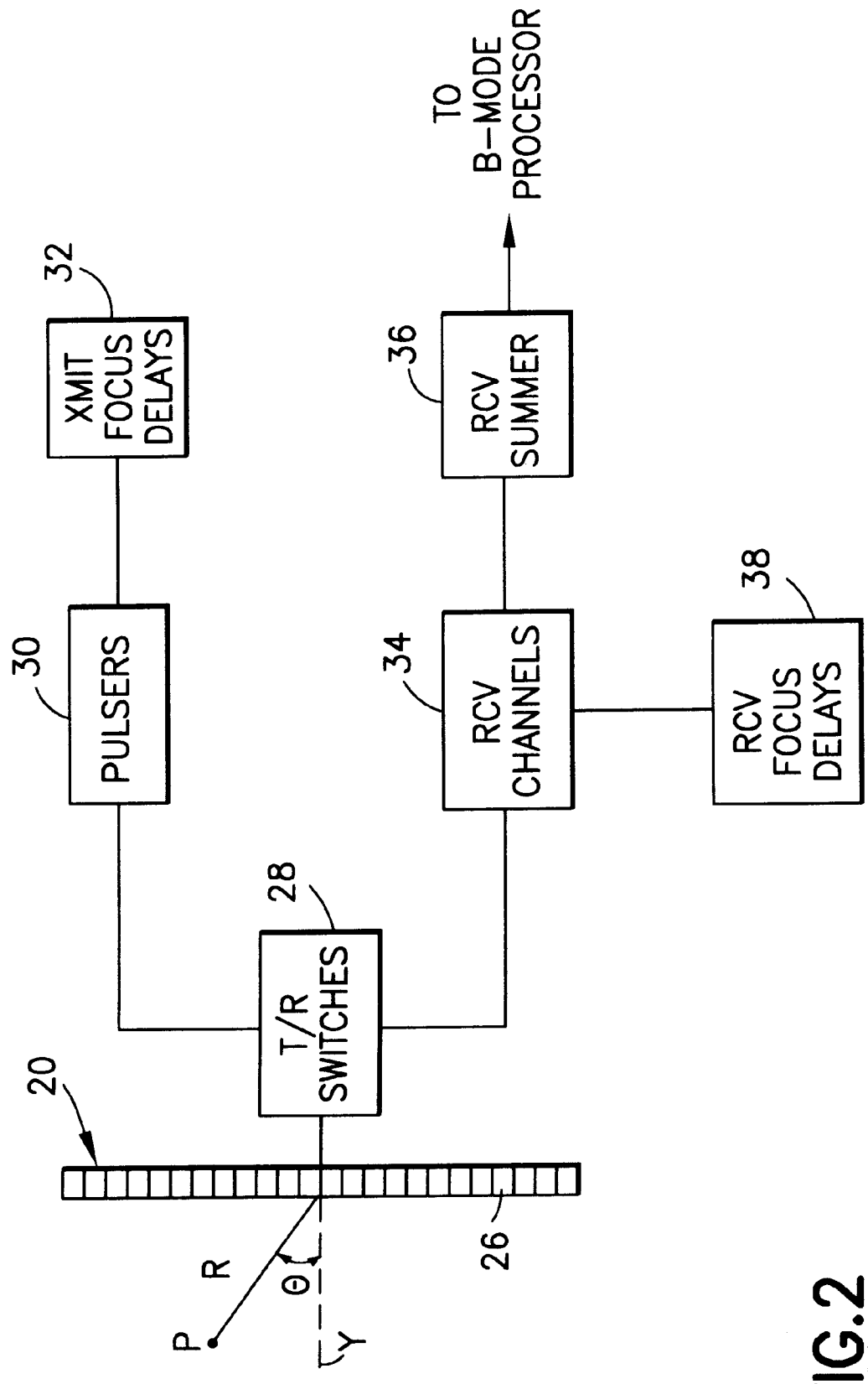
FIG. 2 is a block diagram showing details of the pulsing and receiving subsystems incorporated in the system depicted in FIG. 1.
Figure 3:
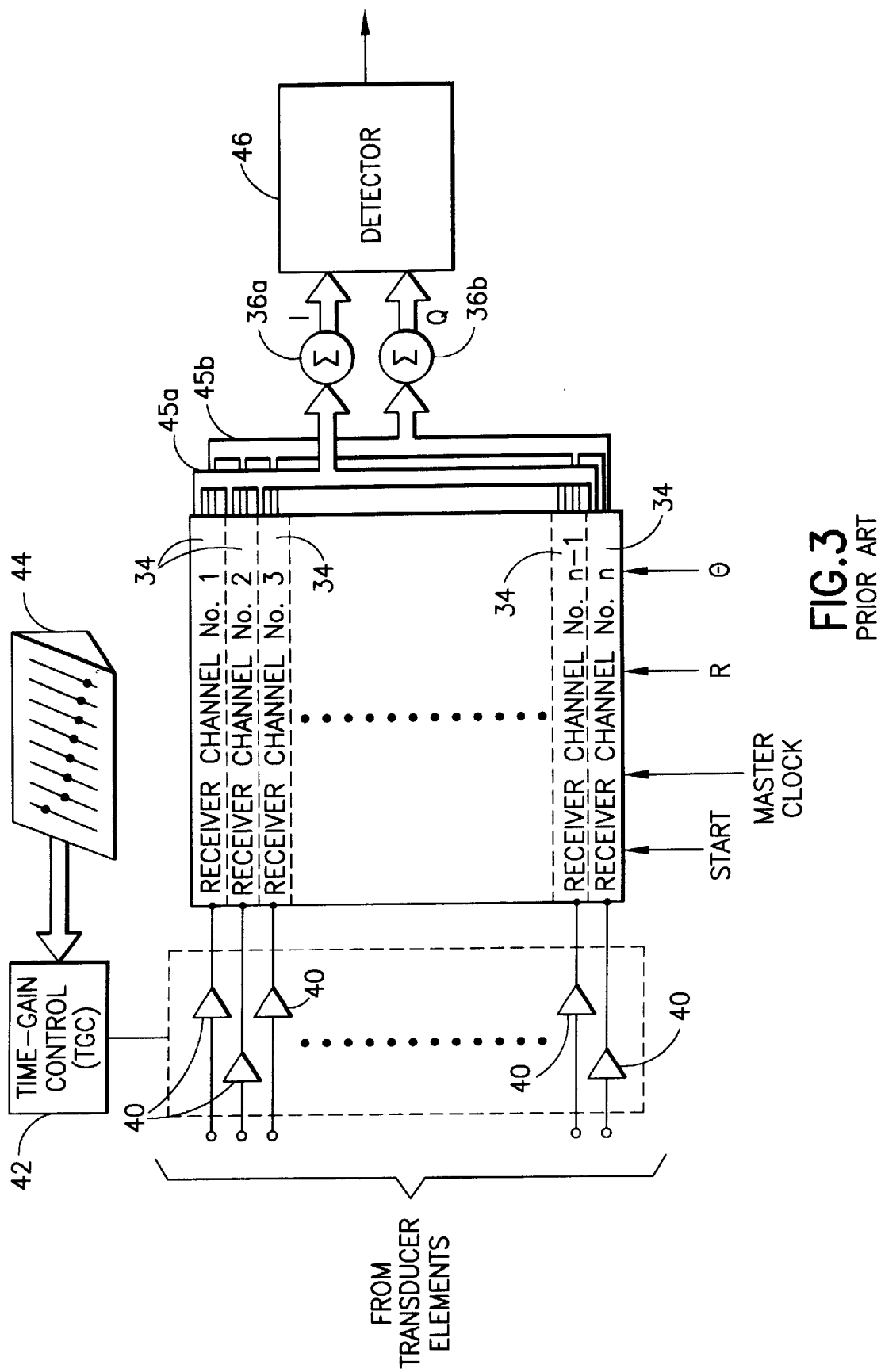
FIG. 3 is a block diagram showing a receiver and a detector respectively forming parts of the beamformer and B-mode processor in the system depicted in FIG. 1.
Figure 4A:
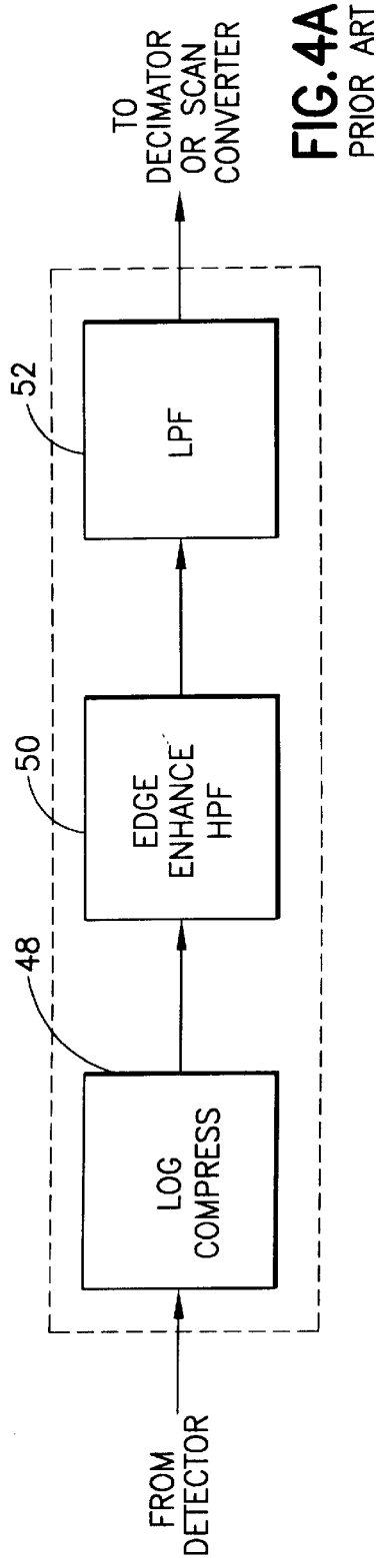
FIGS. 4A–4C are block diagrams showing three prior art configurations of sequential post-detection image processing techniques.
Figure 4B:
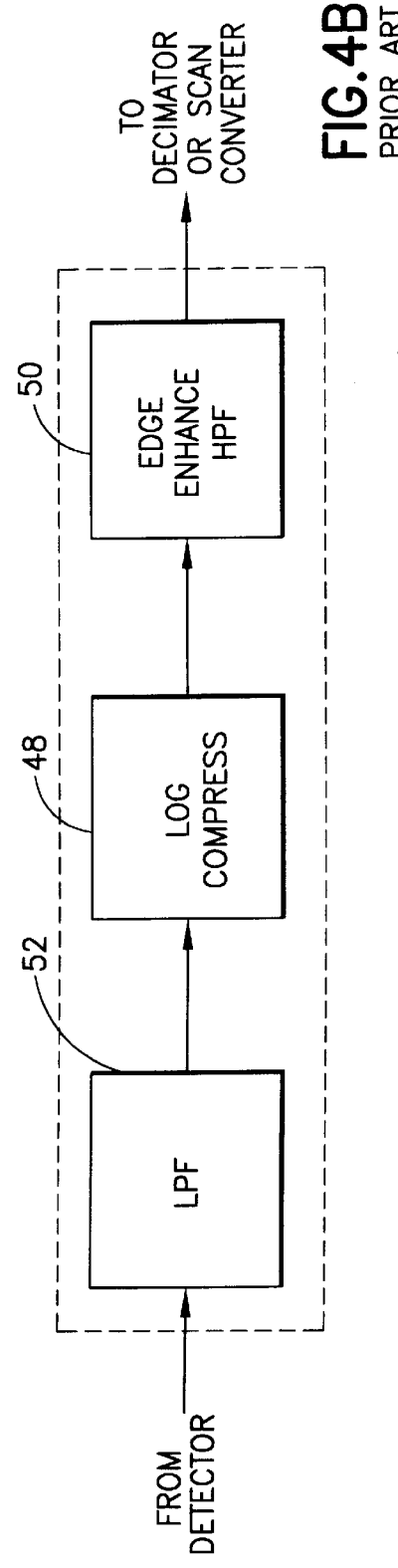
Figure 4C:
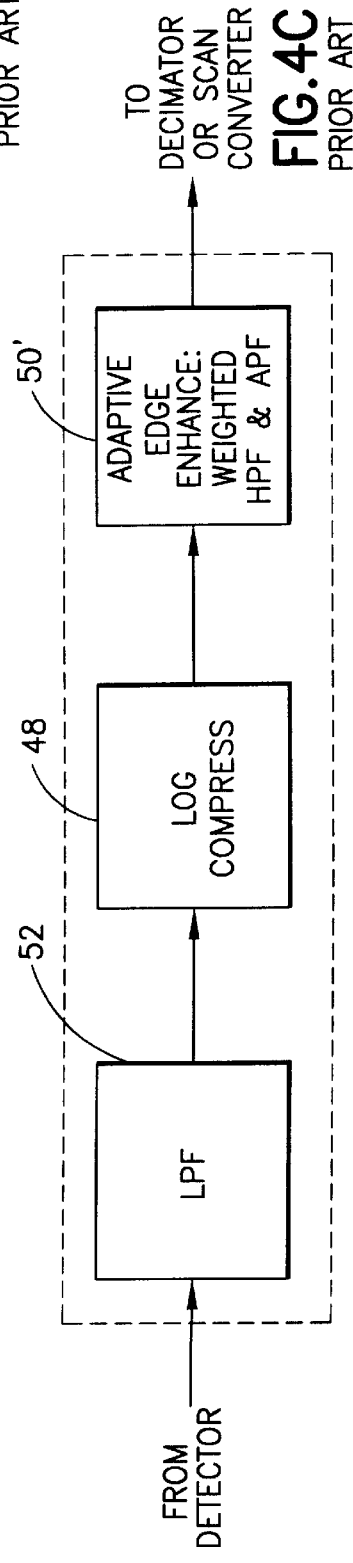
Figure 5:
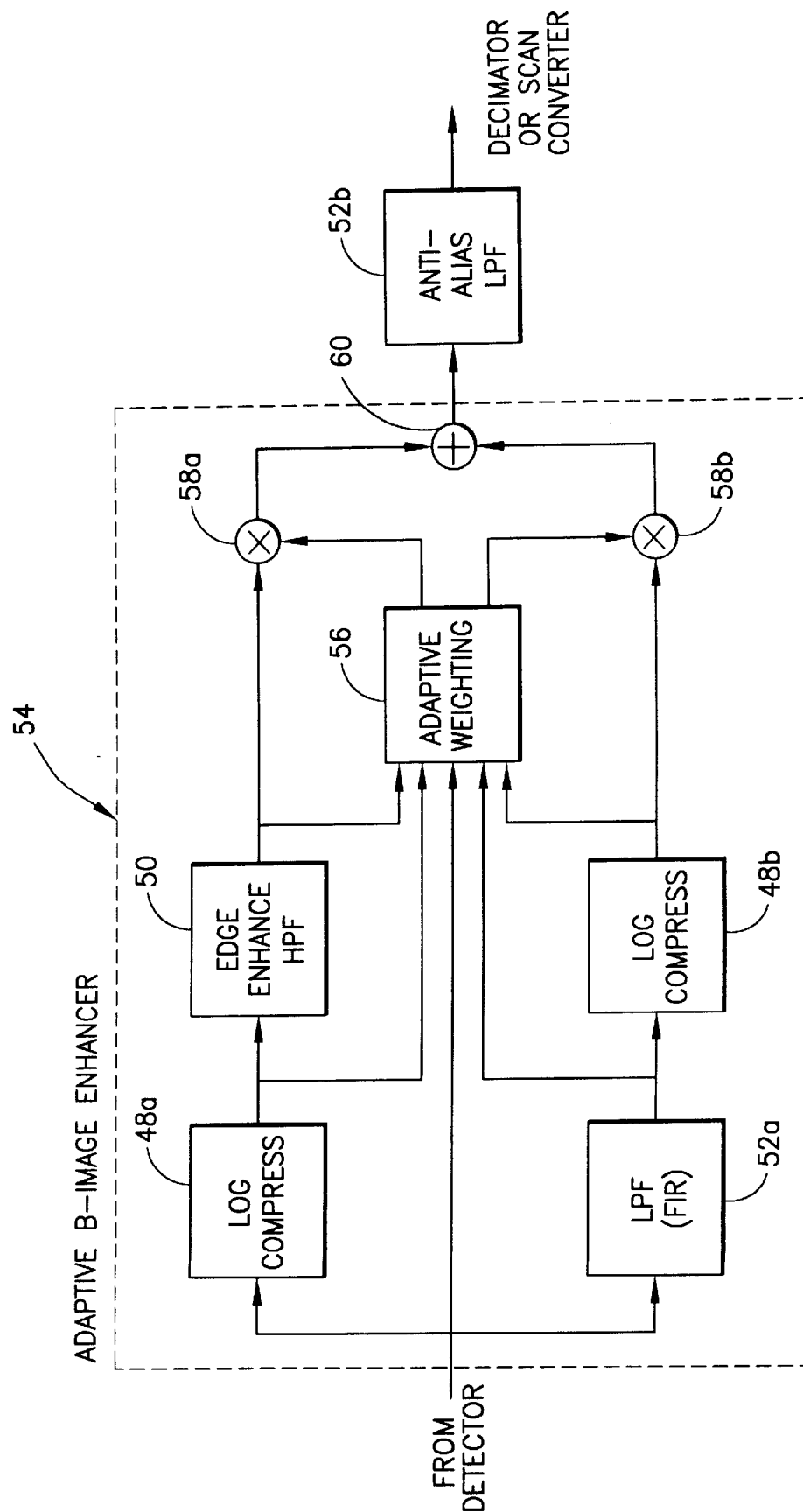
FIG. 5 is a block diagram showing an adaptive B-mode image enhancement technique in accordance with a preferred embodiment of the present invention.

Referring to FIG. 5, the present invention comprises adaptive B-mode image enhancement means 54 which are incorporated in a B-mode processor to receive the output from an envelope detector of the type depicted in FIG. 3 (i.e., block 46). In accordance with the preferred embodiment of the invention, the adaptive B-mode image enhancer 54 comprise a parallel path configuration that combines the advantages and eliminates the disadvantages of the alternate prior art configurations. This adaptive B-mode image enhancer 54 is not simply an adaptive edge enhancement filter like that shown in FIG. 4C, but rather is a more general post-detection image enhancement method that includes a speckle reduction filter and logarithmic compression. Also, in its most general form as shown in FIG. 5, adaptive B-mode image enhancer 54 is not limited to one-dimensional or vector-by-vector processing, but can also use two-dimensional filters for two-dimensional image processing.

In accordance with the method of the invention, the output from the envelope detector in the B-mode processor is output to a first logarithmic compression block 48a, to a first low pass filter 52a and to a first input of an adaptive weighting block 56. The logarithmic compression function 48a is preferably incorporated in a software programmable look-up table. The log-compressed data is then output to an edge-enhancing high pass filter 50 and to a second input of the adaptive weighting block 56. The high-pass-filtered log-compressed data is output to a multiplier 58a and to a third input of the adaptive weighting block 56.

The low pass filter 52a is preferably a Finite Impulse Response filter. The low-pass-filtered data is output to a second logarithmic compression block 48b and to a fourth input of the adaptive weighting block 56. The logarithmic compression function 48b is also preferably incorporated in a software programmable look-up table. The log-compressed low-pass-filtered data is output to a multiplier 58b and to a fifth input of the adaptive weighting block 56.

Depending on the application type, the adaptive weighting block 56 may use any combination of the five data inputs shown in FIG. 5. The weight assignments can be specified by either a set of equations or look-up tables. The adaptive weighting block 56 outputs a first weight W1 to the first multiplier 58a and a second weight W2 to the second multiplier 58b. The sum of weights W1 and W2 equals unity. Multiplier 58a outputs a signal representing the product of weight W1 times the edge-enhanced signal output from high-pass filter 50, whereas multiplier 58b outputs a signal representing the product of weight W2 times the speckle-reduced signal output from block 48b. These multiplier outputs are in turn added in a summer 60. If both the compressed low- and high-pass filtered signals are used as inputs, it is also possible to implement the entire adaptive weighting function 56, 58a and 58b and the summing operation 60 in the form of a look-up table. The summed signal is then output to an optional anti-aliasing low- pass filter 52b. Alternatively the summed signal can be sent to a decimator prior to scan conversion or directly to the scan converter.

In the simplest case, the adaptive weighting block 56 may assign the weights based solely on the output from low pass filter 52a. If the output is large (edge), the weight on the edge enhance filter output is larger and smoothing (smearing) is minimized. If the amplitude is small (speckle), the weight on the smoothed and compressed output should be relatively larger.

As another example, to detect the borders of cysts in an abdominal scan, the adaptive weighting block may monitor the difference between the edge-enhancing high pass filter output and the logarithmically compressed low pass filter output. When a large difference is present (border), more weight will be assigned to the edge enhancement high pass filter output.

In contrast to the prior art, the adaptive B-mode image enhancer 54 shown in FIG. 5 comprises two separate low pass filters 52a and 52b. The former is a smoothing filter which is part of the adaptive B-mode image enhancer 54, and the latter is an anti-aliasing filter, which may be optionally included between adaptive B-mode image enhancer 54 and the decimator or scan converter. Low pass filters 52a and 52b are separated because they serve different functions which are best performed at different points in the signal processing chain.

A constant-tap FIR filter (box-car for 1D vector processing) is the preferred speckle reduction low pass filter because it gives the mean value of the detected envelope signal, which has been shown to be the maximum likelihood estimate of the underlying backscattered energy.

The edge-enhancing high pass filter 50 is not restricted to being a FIR filter. It can also be implemented using an IIR filter since its data input has a compressed dynamic range such that any filter output transient should be very small.

The adaptive weighting in accordance with the broad concept of the invention may be a function of one or more of the following, as seen in FIG. 5: the detector output; the log-compressed detector output; the output of high pass filter 50; the output of low pass filter 52a; and the log-compressed low pass filter output.

Compared to the prior art, adaptive B-mode image enhancer 54 requires mainly one additional logarithmic operation, which should not add any major computational burden or hardware cost.

In addition, the adaptive B-mode image enhancer 54 can be implemented in either hardware (e.g., discrete components or ASICS) or software (e.g., digital signal processors or PentiumPro).

The foregoing preferred embodiments have been disclosed for the purpose of illustration. Variations and modifications will be readily apparent to those skilled in the art of ultrasonic imaging systems. All such variations and modifications are intended to be encompassed by the claims set forth hereinafter.

We claim:

1. A B-mode processor for an ultrasound imaging system, comprising:

an envelope detector comprising an output;

first means for logarithmic data compression comprising an input connected to receive said output of said envelope detector and an output;

high pass filtering means for enhancing edges comprising an input connected to receive said output of said first logarithmic data compression means and an output;

first low pass filtering means for smoothing speckle comprising an input connected to receive said output of said envelope detector and an output;

second means for logarithmic data compression comprising an input connected to receive said output of said first low pass filtering means and an output; and adaptive means for image enhancement comprising input means connected to at least one of said outputs and means for outputting a signal representing the sum of a first weighting factor applied to a signal output from said high pass filtering means plus a second weighting factor applied to a signal output from said first low pass filtering means, said first and second weighting factors being determined as a function of a signal received from one of said outputs.

2. The B-mode processor as defined in claim 1, wherein said adaptive means for image enhancement comprises:

adaptive weighting means comprising input means connected to at least one of said outputs and comprising first and second outputs, wherein said adaptive weighting means outputs said first and second weighting actors on said first and second outputs respectively;

a first multiplier comprising a first input connected to said first output of said adaptive weighting means, a second input connected to receive said output of said high pass filtering means and an output, wherein said first multiplier outputs a signal representing the product of the signals received on said first and second inputs of said first multiplier;

a second multiplier comprising a first input connected to said second output of said adaptive weighting means, a second input connected to receive said output of said second logarithmic data compression means and an output, wherein said second multiplier outputs a signal representing the product of the signals received on said first and second inputs of said second multiplier; and summing means comprising first and second inputs connected to receive said outputs of said first and second multipliers respectively and an output, wherein said summing means outputs a signal representing the sum of the signals received on said first and second inputs of said summing means.

3. The B-mode processor as defined in claim 1, wherein said adaptive means for image enhancement comprises a look-up table having an addressing input connected to said one of said outputs.

4. The B-mode processor as defined in claim 1, wherein said first and second weighting factors are determined as a function of the signal received from said output of said first low pass filtering means.

5. The B-mode processor as defined in claim 1, wherein said first and second weighting factors are determined as a function of the difference between the signal received from said output of said high pass filtering means and the signal received from said output of said second logarithmic data compression means.

6. The B-mode processor as defined in claim 1, further comprising second low pass filtering means for anti-aliasing comprising an input connected to receive said output of said adaptive means for image enhancement.

7. A method for post-detection image processing in an ultrasound imaging system, comprising the steps of:

logarithmically compressing a stream of digital samples representing an envelope to produce a logarithmically compressed digital sample stream;

high pass filtering said logarithmically compressed digital sample stream to produce a high-pass-filtered logarithmically compressed digital sample stream representing an image having enhanced edges;

low pass filtering said stream of digital samples representing an envelope to produce a low-pass-filtered digital sample stream having smoothed speckle;

logarithmically compressing said low-pass-filtered digital sample stream to produce a logarithmically compressed low-pass-filtered digital sample stream; and generating an image-enhanced signal representing the sum of a first weighting factor applied to said high-pass-filtered logarithmically compressed digital sample stream plus a second weighting factor applied to said logarithmically compressed low-pass-filtered digital sample stream.

8. The method as defined in claim 7, wherein said first and second weighting factors are determined as a function of at least one of the following: said stream of digital samples representing an envelope; said logarithmically compressed digital sample stream; said high-pass-filtered logarithmically compressed digital sample stream; said low-pass-filtered digital sample stream; and said logarithmically compressed low-pass-filtered digital sample stream.

9. The method as defined in claim 7, wherein said first and second weighting factors are determined as a function of said low-pass-filtered digital sample stream.

10. The method as defined in claim 7, wherein said first and second weighting factors are determined as a function of the difference between said high-pass-filtered logarithmically compressed digital sample stream and said logarithmically compressed low-pass-filtered digital sample stream.

11. The method as defined in claim 7, further comprising the step of low pass filtering said image-enhanced signal.

12. The method as defined in claim 7, further comprising the step of displaying an image derived from said image-enhanced signal.

13. An ultrasound imaging system comprising:
   a transducer array comprising a multiplicity of piezoelectric transducer elements;
   a beamformer comprising a multiplicity of beamformer channels;
   switching means for coupling said piezoelectric transducer elements and said beamformer channels;
   an envelope detector coupled to receive a stream of digital samples representing a receive beam from said beamformer and output a stream of digital samples representing an envelope;
   means for logarithmically compressing said stream of digital samples representing an envelope to produce a logarithmically compressed digital sample stream;
   means for high pass filtering said logarithmically compressed digital sample stream to produce a high-pass-filtered logarithmically compressed digital sample stream representing an image having enhanced edges;
   means for low pass filtering said stream of digital samples representing an envelope to produce a low-pass-filtered digital sample stream having smoothed speckle;
   means for logarithmically compressing said low-pass-filtered digital sample stream to produce a logarithmically compressed low-pass-filtered digital sample stream;
   means for generating an image-enhanced signal representing the sum of a first weighting factor applied to said high-pass-filtered logarithmically compressed digital sample stream plus a second weighting factor applied to said logarithmically compressed low-pass-filtered digital sample stream; and
   means for displaying an image derived from said image-enhanced signal.

14. The ultrasound imaging system as defined in claim 13, wherein said first and second weighting factors are determined as a function of at least one of the following: said stream of digital samples representing an envelope; said logarithmically compressed digital sample stream; said high-pass-filtered logarithmically compressed digital sample stream; said low-pass-filtered digital sample stream; and said logarithmically compressed low-pass-filtered digital sample stream.

15. The ultrasound imaging system as defined in claim 13, wherein said first and second weighting factors are determined as a function of said low-pass-filtered digital sample stream.

16. The ultrasound imaging system as defined in claim 13, wherein said first and second weighting factors are determined as a function of the difference between said high-pass-filtered logarithmically compressed digital sample stream and said logarithmically compressed low-pass-filtered digital sample stream.

17. The ultrasound imaging system as defined in claim 13, further comprising means for low pass filtering said image-enhanced signal prior to display.

18. The ultrasound imaging system as defined in claim 13, wherein said generating means comprise:
   means for applying a first weighting factor to said high-pass-filtered logarithmically compressed digital sample stream to form a weighted high-pass-filtered logarithmically compressed digital sample stream;
   means for applying a second weighting factor to said logarithmically compressed low-pass-filtered digital sample stream to form a weighted logarithmically compressed low-pass-filtered digital sample stream; and
   means for summing said weighted high-pass-filtered logarithmically compressed digital sample stream and said weighted logarithmically compressed low-pass-filtered digital sample stream to form said image-enhanced signal.

19. The ultrasound imaging system as defined in claim 13, wherein said generating means comprise a look-up table.

20. An ultrasound imaging system comprising:
   a transducer array comprising a multiplicity of piezoelectric transducer elements;
   a beamformer comprising a multiplicity of beamformer channels;
   switching means for coupling said piezoelectric transducer elements and said beamformer channels;
   an envelope detector coupled to receive a stream of digital samples representing a receive beam from said beamformer and output a stream of digital samples representing an envelope;
   means for high pass filtering a first digital sample stream derived from said stream of digital samples representing an envelope to produce a high-pass-filtered digital sample stream representing an image having enhanced edges;
   means for low pass filtering a second digital sample stream derived from said stream of digital samples representing an envelope to produce a low-pass-filtered digital sample stream having smoothed speckle;
   means for applying a first weighting factor to a third digital sample stream derived from said high-pass-filtered digital sample stream to form a weighted high-pass-filtered digital sample stream;
   means for applying a second weighting factor to a fourth digital sample stream derived from said low-pass-filtered digital sample stream to form a weighted low-pass-filtered digital sample stream;
   means for summing said weighted high-pass-filtered digital sample stream and said weighted low-pass-filtered digital sample stream to form a summed digital sample stream; and
   means for displaying an image derived from said summed digital sample stream.

* * * * *